(12) United States Patent
Tsuchida

(10) Patent No.: US 11,996,020 B2
(45) Date of Patent: May 28, 2024

(54) DISPLAY DEVICE

(71) Applicant: SHARP KABUSHIKI KAISHA, Sakai (JP)

(72) Inventor: Kenichiroh Tsuchida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 64 days.

(21) Appl. No.: 17/920,021

(22) PCT Filed: May 29, 2020

(86) PCT No.: PCT/JP2020/021433
§ 371 (c)(1),
(2) Date: Oct. 20, 2022

(87) PCT Pub. No.: WO2021/240808
PCT Pub. Date: Dec. 2, 2021

(65) Prior Publication Data
US 2023/0162636 A1    May 25, 2023

(51) Int. Cl.
*G09G 3/00*     (2006.01)
*H04M 1/02*     (2006.01)

(52) U.S. Cl.
CPC .......... *G09G 3/035* (2020.08); *H04M 1/0214* (2013.01); *H04M 1/0268* (2013.01)

(58) Field of Classification Search
CPC .. G09G 3/035; H04M 1/0214; H04M 1/0268; H04M 1/0216
See application file for complete search history.

(56) References Cited

U.S. PATENT DOCUMENTS

| | | | |
|---|---|---|---|
| 11,723,163 B1* | 8/2023 | Cavallaro | H04M 1/0237 |
| | | | 361/807 |
| 2016/0291642 A1* | 10/2016 | Kwak | G06F 3/04886 |
| 2017/0092892 A1* | 3/2017 | Zhang | H10K 50/844 |
| 2017/0200915 A1 | 7/2017 | Lee et al. | |
| 2017/0374749 A1* | 12/2017 | Lee | G06F 1/1616 |
| 2019/0306290 A1* | 10/2019 | Lee | G06F 1/1681 |
| 2020/0162596 A1* | 5/2020 | Kim | H05K 1/028 |
| 2020/0249723 A1* | 8/2020 | Mizoguchi | G06F 1/1626 |
| 2020/0352046 A1* | 11/2020 | Kim | H04M 1/0268 |
| 2021/0041601 A1* | 2/2021 | Oh | G06F 1/1609 |
| 2021/0141416 A1* | 5/2021 | Cho | G06F 1/1637 |
| 2021/0201710 A1* | 7/2021 | Kim | G06F 1/1616 |
| 2022/0115768 A1* | 4/2022 | Oh | H01Q 9/42 |

(Continued)

FOREIGN PATENT DOCUMENTS

JP     2017126061 A     7/2017

*Primary Examiner* — Lewis G West
(74) *Attorney, Agent, or Firm* — ScienBiziP, P.C.

(57) ABSTRACT

A display device according to one aspect of the present disclosure can undergo selection between a closed state where a case housing a display module renders bezels adjacent to each other with a hinge interposed therebetween, and an open state where the case renders the bezels spaced from each other with the hinge interposed therebetween, the display module has an uppermost layer (window film) provided with an engaged portion with which an engaging portion provided in a cover portion of each bezel can engage, and in conjunction with the opening of the case, the engaging portion engages with the engaged portion and pulls the uppermost layer in such manner the uppermost layer is in parallel.

10 Claims, 7 Drawing Sheets

(56) References Cited

U.S. PATENT DOCUMENTS

| | | | |
|---|---|---|---|
| 2022/0182476 A1* | 6/2022 | Cha | H04M 1/0216 |
| 2022/0272185 A1* | 8/2022 | Ju | G06F 1/1681 |
| 2022/0272853 A1* | 8/2022 | Kim | G06F 1/1624 |
| 2022/0322547 A1* | 10/2022 | Wang | H05K 5/0017 |
| 2023/0006171 A1* | 1/2023 | Choi | H05K 5/0017 |
| 2023/0057510 A1* | 2/2023 | Park | H04R 1/2857 |

* cited by examiner

ORTHOGONAL DIRECTION

DISPLAY DEVICE

TECHNICAL FIELD

The present disclosure relates to display devices, and more specifically, to a display device having a foldable display surface.

BACKGROUND ART

Previously known folding portable terminals incorporate a display device having a body that is to be developed so as to increase its display region. However, two displays are incorporated in these known examples. In contrast to this, a recently developed type is foldable displays, which are incorporated in smartphones. The characteristic of organic EL displays, i.e., being foldable, is applied to smartphones, which are known as foldable smartphones or other names.

For instance, Patent Literature discloses a foldable display device having a stack of, in sequence, a display panel, a first adhesive, a polarizer, a second adhesive and a window, and being bendable along a bending axis.

CITATION LIST

Patent Literature

Patent Literature 1: Japanese Unexamined Patent Application Publication No. 2017-126061

SUMMARY

Technical Problem

In the technique in Patent Literature 1, folding the device causes positional shifts between the stacked layers, thus possibly rendering the display surface flexural.

One aspect of the present disclosure aims to provide a display device that can avoid flection in its display surface even when the display surface undergoes folding.

Solution to Problem

To solve the above problem, a display device according to one aspect of the present disclosure includes the following: a display module incorporating at least a display panel, including a stack of a plurality of function layers structured mutually slidably, and structured in a foldable manner; and a case having a first bezel and a second bezel respectively attached to one end and another end of the lowermost layer of the display module with a slide mechanism interposed, the case having a hinge provided between the first bezel and the second bezel, the case housing the display module in a foldable manner, wherein the case houses the display module in a foldable manner in response to selection between a closed state where the first bezel and the second bezel are adjacent to each other with the hinge interposed, and an open state where the first bezel and the second bezel are spaced from each other with the hinge interposed, the case is provided with a coupling portion that couples the hinge and the first bezel together in such a manner that the hinge is located above the uppermost layer of the display module when the case is brought into the open state, and the case is provided with a coupling portion that couples the hinge and the second bezel together in such a manner that the hinge is located above the uppermost layer of the display module when the case is brought into the open state, the case has a cover portion provided in each of the first bezel and the second bezel, and covering one end and another end of the uppermost layer of the display module, the cover portion is provided with an engaging portion that engages with an engaged portion provided at the one end and the another end of the uppermost layer of the display module, and in conjunction with an operation from the closed state of the case into the open state of the case, the engaging portion engages with the engaged portion and pulls the uppermost layer of the display module in such a manner that the uppermost layer is in parallel.

Advantageous Effect of Disclosure

The aspect of the present disclosure can provide a display device that can avoid flection in its display surface even when the display surface undergoes folding.

Figure 7:
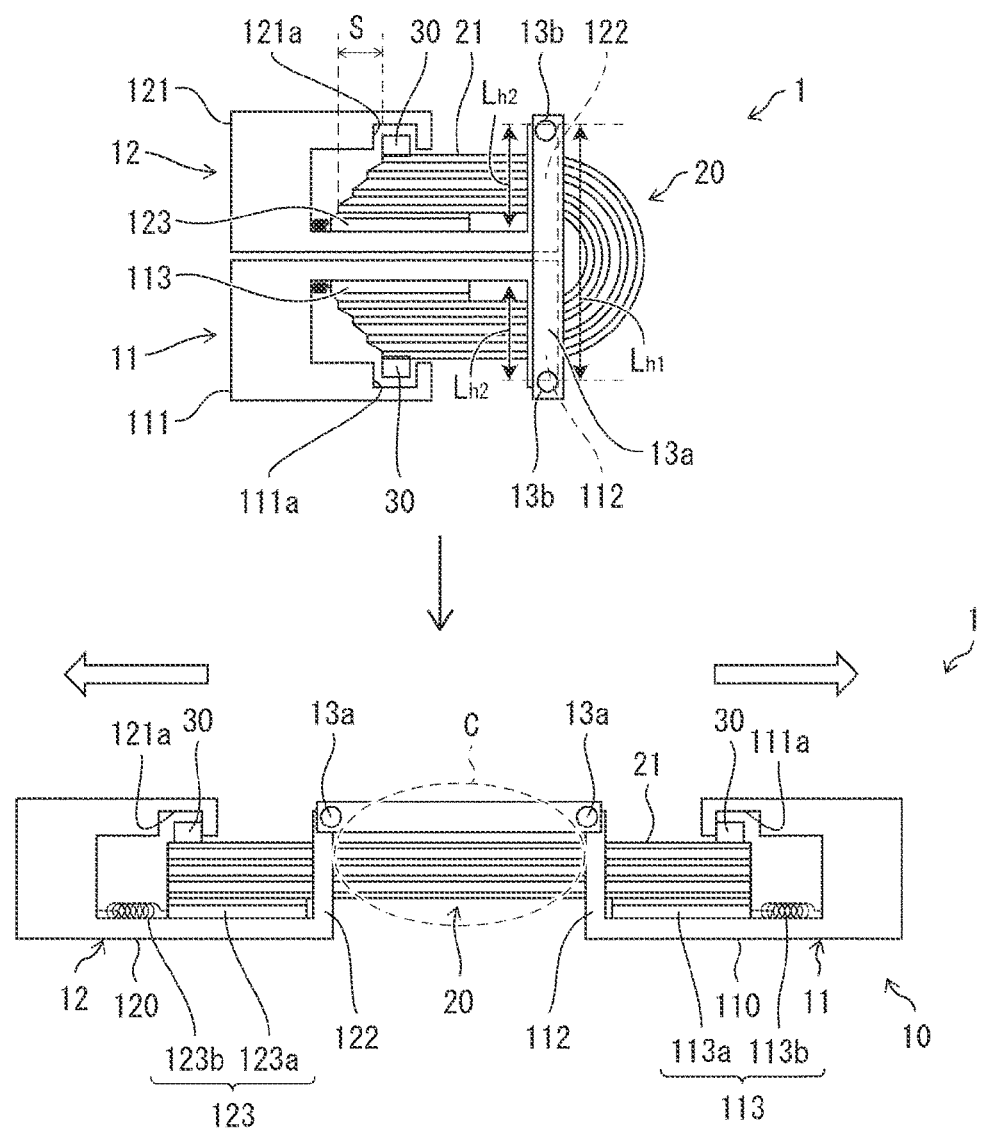

The upper part of FIG. 7 is a side view of a display device 1 with its case 10 closed, that is, with its display surface folded, and the lower part of the drawing is a side view of the display device 1 with the case 10 being opened from the closed state.

Figure 8:
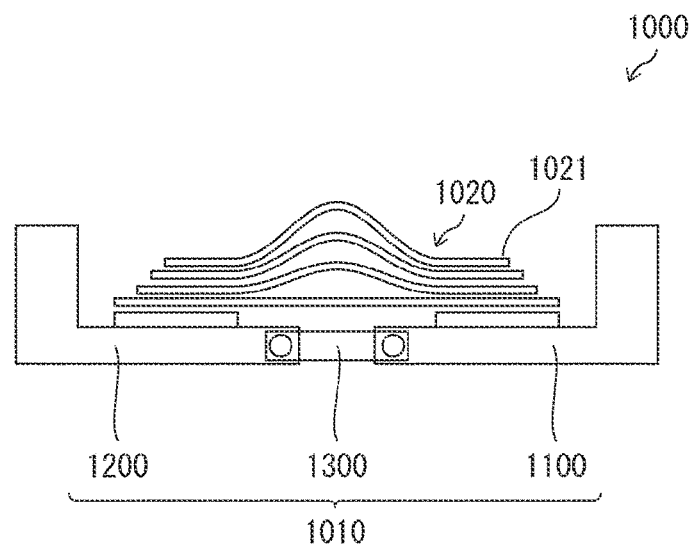

FIG. 8 illustrates a display device according to a comparative configuration, which is not included in one aspect of the present disclosure.

Figure 9:
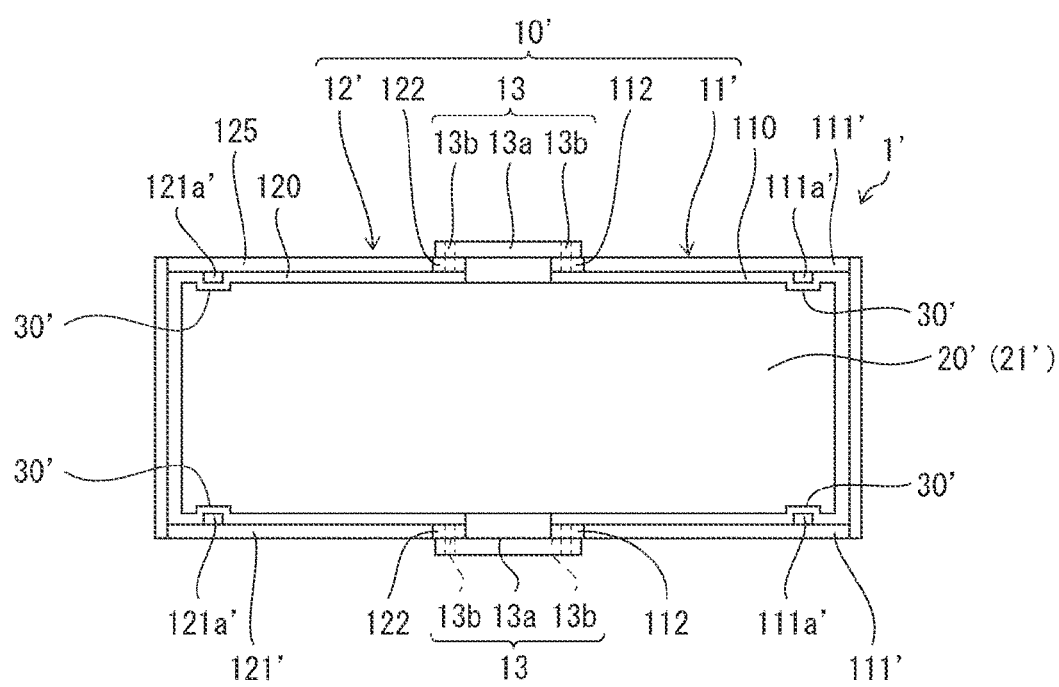

FIG. 9 is a front view of a display device according to another embodiment of the present disclosure viewed from its display surface.

Figure 10:
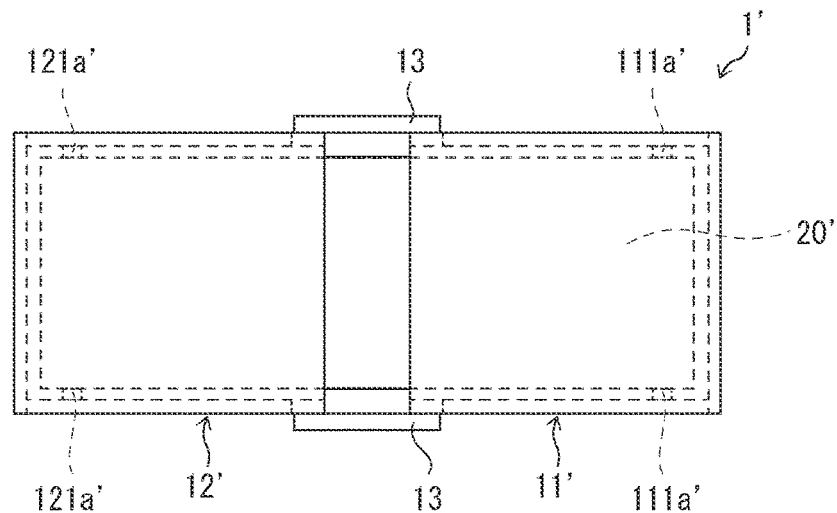

FIG. 10 illustrates the display device in FIG. 9 viewed from its non-display surface.

Figure 11:
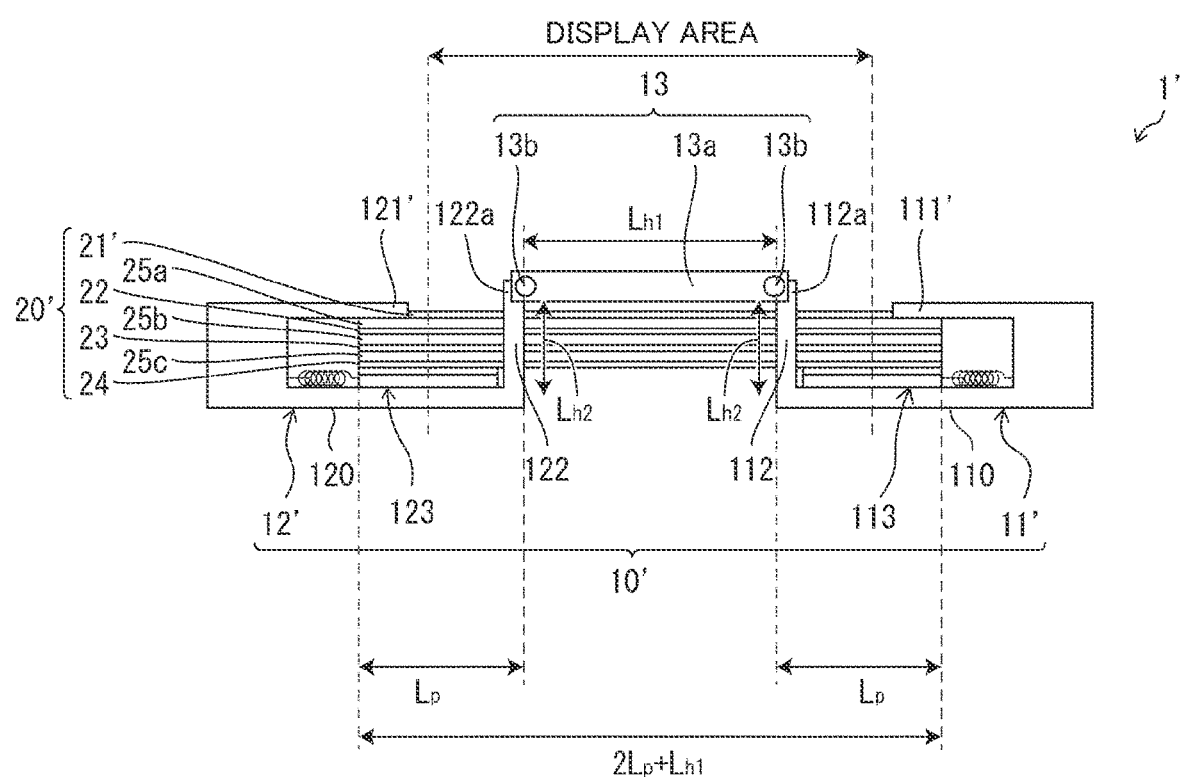

FIG. 11 is a side view of the display device in FIG. 9.

Figure 1:
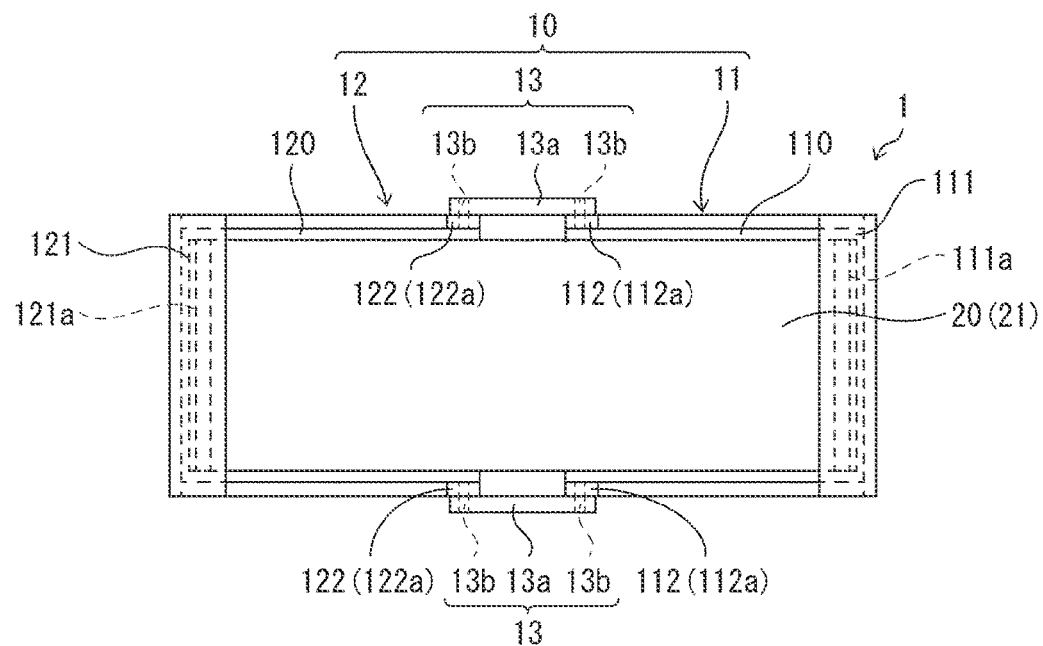
FIG. 1 is a front view of a display device according to one embodiment of the present disclosure viewed from its display surface.
Figure 12:
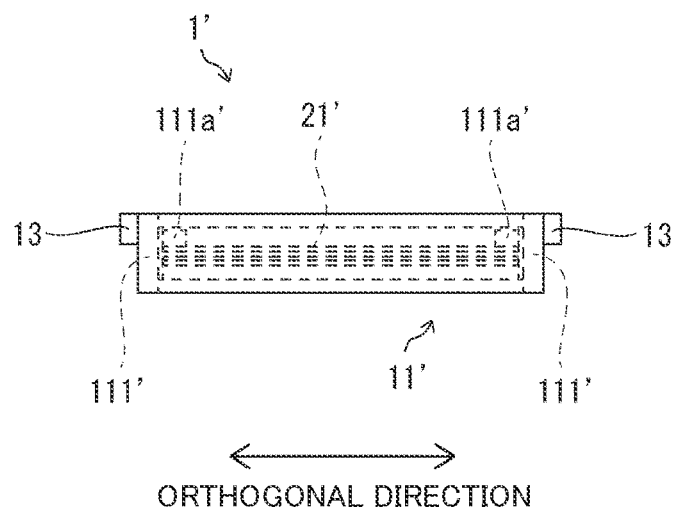

FIG. 12 is a side view of the display device in FIG. 1 and is a side view of the display device viewed from a direction orthogonal to the direction in FIG. 11.

Figure 3:
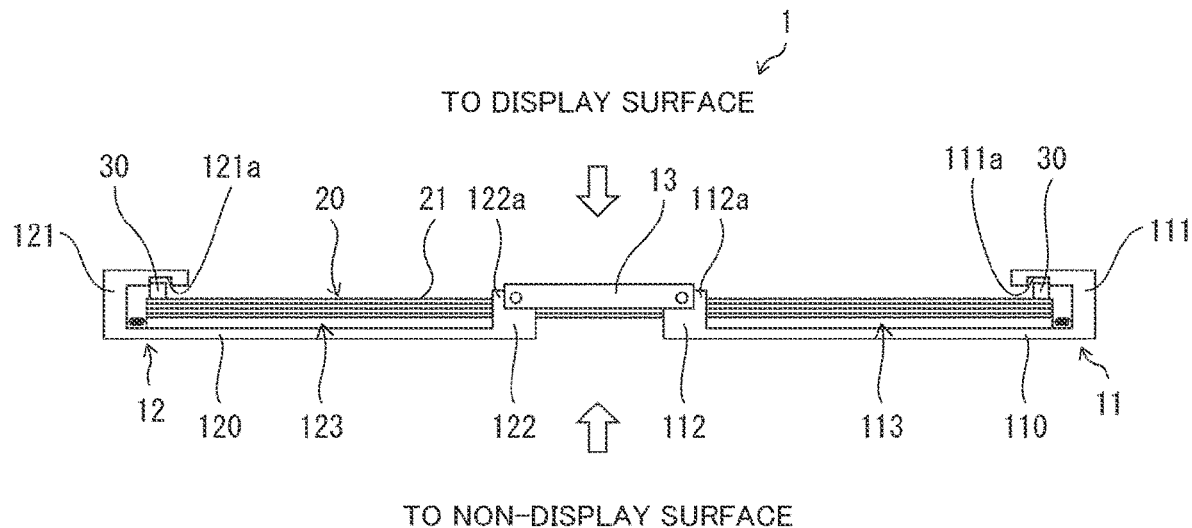
FIG. 3 is a side view of the display device in FIG. 1.
Figure 13:
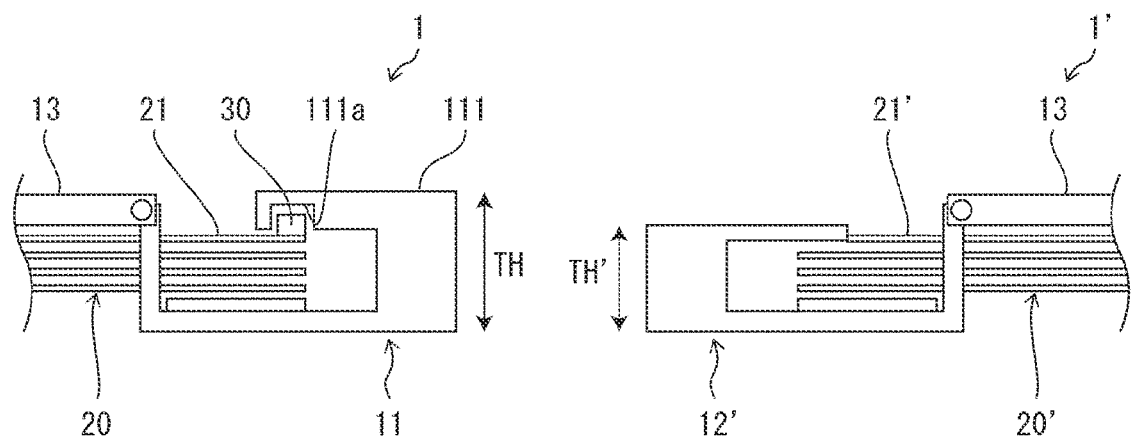

FIG. 13 illustrates the display device in FIG. 11 viewed laterally with only a region provided with an engaging portion being enlarged, and the display device in FIG. 3 viewed laterally with only a region provided with an engaging portion being enlarged.

DESCRIPTION OF EMBODIMENTS

First Embodiment

Figure 2:
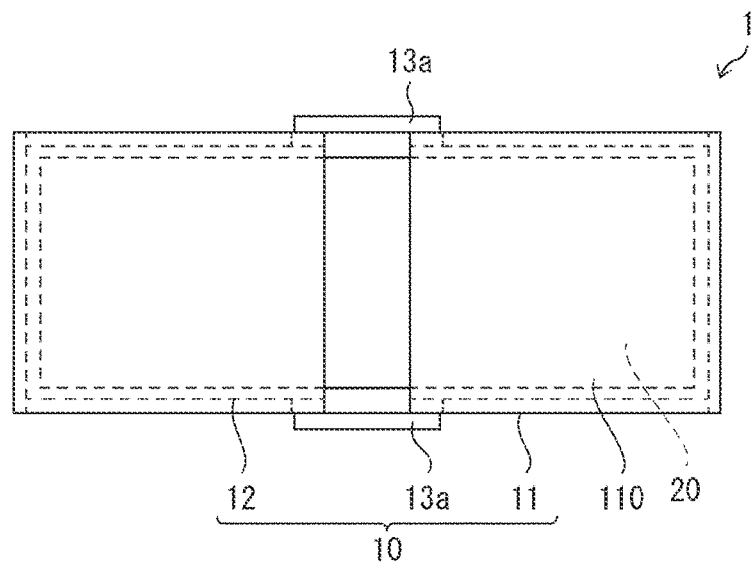
FIG. 2 illustrates the display device in FIG. 1 viewed from its non-display surface.
Figure 4:
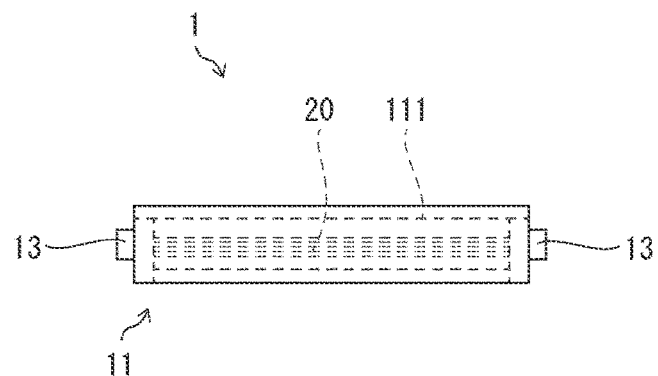
FIG. 4 is a side view of the display device in FIG. 1 and is a side view of the display device viewed from a direction orthogonal to the direction in FIG. 3.

A display device according to one aspect of the present disclosure will be described with reference to FIG. 1 through FIG. 8. FIG. 1 is a front view of a display device 1 according to this embodiment viewed from its display surface. FIG. 2 illustrates the backside of the display device 1 viewed from its non-display surface, which corresponds to the backside of the display surface in FIG. 1. FIG. 3 a side view of the display device 1. FIG. 4 is a side view of the display device viewed from a direction orthogonal to the direction in FIG. 3.

The display device 1 according to this embodiment is a so-called foldable display device having a foldable display module. The display device 1 can be used as, but not limited to, a portable terminal, including a smartphone and a tablet terminal.

The display device 1 includes a case 10 and a display module 20, as illustrated in FIG. 1 and FIG. 2.

The case 10 has the following: a first bezel 11 and a second bezel 12 respectively attached to one end and the other end of the lowermost layer of the display module 20 with a slide mechanism 113 and a slide mechanism 123 (see FIG. 3) interposed therebetween; and a hinge 13 provided between the first bezel 11 and the second bezel 12, and the case 10 houses the display module 20 in a foldable manner.

The first bezel 11 has a bottom 110, which is flat, a cover portion 111, and coupling portions 112. The slide mechanism 113 (see FIG. 3) is disposed on the bottom 110. The cover portion 111 is provided on a side of the bottom 110 opposite to a side adjacent to the second bezel 12. The cover portion 111 is provided so as to extend from the bottom 110 and to cover one of the ends of the uppermost layer of the display module 20. Part of the cover portion 111 faces a window film 21, which constitutes the uppermost layer of the display module 20 outside the display area of the display module 20. The coupling portions 112 are provided the respective right and left ends, which are outside a region where the display module 20 is placed, of a side of the bottom 110 adjacent to the second bezel 12. The coupling portions 112 are provided at a predetermined height from a surface of the bottom 110 where the display module 20 is placed and are coupled to the hinge 13 at distal ends 112*a*, the details of which will be described later on.

The second bezel 12 has a bottom 120, which is flat, a cover portion 121, and coupling portions 122. The slide mechanism 123 (see FIG. 3) is disposed on the bottom 120. The cover portion 121 is provided on a side of the bottom 120 opposite to a side adjacent to the first bezel 11. The cover portion 121 is provided so as to extend from the bottom 120 and to cover the other end of the uppermost layer of the display module 20. Part of the cover portion 121 faces the window film 21, which constitutes the uppermost layer of the display module 20 outside the display area of the display module 20. The coupling portions 122 are provided at the respective right and left ends, which are outside the region where the display module 20 is placed, of a side of the bottom 120 adjacent to the first bezel 11. The coupling portions 122 are provided at a predetermined height from a surface of the bottom 120 where the display module 20 is placed and are coupled to the hinge 13 at distal ends 122*a*, the details of which will be described later on.

Here, the coupling portions 112 and 122 of the case 10 are provided in such a manner that the hinge 13 is located above the window film 21, constituting the uppermost layer of the display module 20, when the case 10 is brought into an open state, where, as illustrated in FIG. 1 and FIG. 2, the first bezel 11 and the second bezel 12 are spaced with the hinge 13 interposed therebetween. It is noted that the coupling portions 112 and 122, although respectively integrated with the first bezel 11 and the second bezel 12 in this embodiment, may be separated from the respective bezels. Such a separate coupling portion also needs to couple the hinge 13 and the first bezel 11 together in such a manner that the hinge 13 is located above the window film 21, constituting the uppermost layer of the display module 20.

It is also noted that the cover portions 111 and 121, although respectively integrated with the first bezel 11 and the second bezel 12 in this embodiment, may be separated from the respective bezels.

The hinge 13 couples the first bezel 11 and the second bezel 12 together. To be specific, the hinge 13 includes the following: a pair of hinge bodies 13*a* provided so as to sandwich the display module 20; and a rotation shaft 13*b* provided at one end and the other end of each of the pair of hinge bodies 13*a*, and coupled to be able to rotate the distal ends of the coupling portions 112 and 122. The pair hinge bodies 13*a* couples the first bezel 11 and the second bezel 12 together and is disposed on both of the right and left sides the first bezel 11 and second bezel 12. The left hinge body 13*a* is coupled to the left coupling portion 112 and coupling portion 122 with the rotation shafts 13*b* interposed therebetween, and this hinge body 13*a* has a predetermined length, as described later on. The right hinge body 13*a* is likewise coupled to the right coupling portion 112 and coupling portion 122 with the rotation shafts 13*b* interposed therebetween, and this hinge body 13*a* has a predetermined length, as described later on. The hinge 13 is disposed laterally out of the first bezel 11 (and the second bezel 12), as illustrated in FIG. 4.

The first bezel 11 and the second bezel 12 can rotate (pivot) about the rotation shafts 13*b* of the hinge 13. This enables the display module 20, disposed across the bottom 110 of the first bezel 11 and the bottom 120 of the second bezel 12, to undergo selection between a closed state, where the display module 20 is folded with the display surface protruding so that the first bezel 11 and the second bezel 12 become close to each other with the hinge 13 interposed therebetween, and an open state, where the folded display module 20 is developed to be flat so that the first bezel 11 and the second bezel 12 are spaced from each other with the hinge 13 interposed therebetween. The closed or folded state is illustrated in the upper part of FIG. 7.

The display module 20 incorporates at least a display panel and includes a stack of a plurality of function layers structured mutually slidably.

Figure 5:
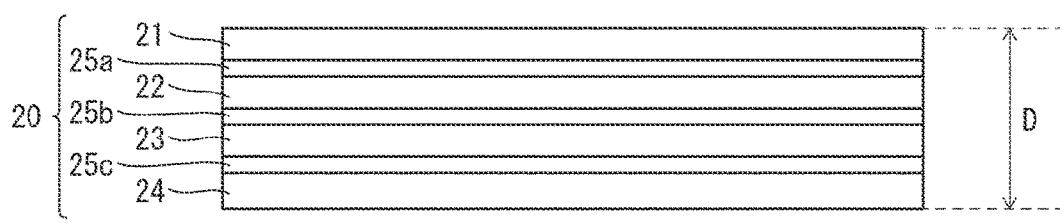
FIG. 5 is a schematic view a specific configuration of a display module included in the display device in FIG. 1.

FIG. 5 is a schematic view of a specific configuration of the display module 20. As illustrated in FIG. 5, the display module 20 includes the following for instance, sequentially disposed: a display panel 24 (function layer) constituting the lowermost layer; a touch panel 23 (function layer); a polarizing plate 22 (function layer); and the window film 21 (function layer) constituting the uppermost layer. These individual layers are joined by adhesive layers 25*a*, 25*b* and 25*c* (hereinafter, generically referred to as an adhesive layer 25). That is, the adhesive layer 25*a* is provide between the window film 21 and the polarizing plate 22, the adhesive layer 25*b* is provided between the polarizing plate 22 and the touch panel 23, and the adhesive layer 25*c* is provided between the touch panel 23 and the display panel 24. These adhesive layers 25 each can be composed of a well-known transparent adhesive (OCA). Further, the display panel 24 includes a light-emitting layer, an anode, a cathode, and other things, all of which are not shown. The light-emitting layer can be composed of, but not limited to, OLEDs; the light-emitting layer may be composed of QLEDs. It is noted that the uppermost layer of the display module 20 is not limited to a window film; the uppermost layer may be a protective film stacked further on a side of the window film adjacent to the display surface with an adhesive layer interposed therebetween.

In the display module 20 with a stack having such a structure as described above, the window film 21, that is, the uppermost layer, is provided with engaged portions 30 (see FIG. 3), which is one characteristic element in this embodiment, that can engage with engaging portions 111a and 121a of the cover portions 111 and 121, provided respectively in the first bezel 11 and the second bezel 12.

Each engaged portion 30 is composed of a protrusion provided in a region on the outside of the display area on a surface of the window film 21 adjacent to the display surface. To be specific, the engaged portion 30 is provided at one end and the other end of the window film 21. The engaged portion 30 can protrude, but not limited to, 0.5 mm long and 1 mm wide. The window film 21 is about 100 μm thick for instance.

The engaged portions 30 may be integrated with the window film 21 or may be fastened to the window film 21 as separate components. Such a separate component may be made of the same material as the window film 21 or may be made of a material different from that of the window film 21. The window film 21 is desirably made of PI or PET, both of which are transparent and flexible. It is noted that although the engaged portions 30 can be made of a material different from that of the window film 21, the engaged portions 30 are desirably made of PI or PET, both of which are transparent and flexible.

In contrast, the cover portions 111 and 121 are provided with engaging portions 111a and 121a that engage with the engaged portions 30. The engaging portion 111a of the cover portion 111 is composed of a recess provided in a region facing the engaged portion 30 extending along the end side of one of the ends of the display module 20. Further, the engaging portion 121a of the cover portion 121 is composed of a recess provided in a region facing the engaged portion 30 extending along the end side of the other end of the display module 20.

Figure 6:
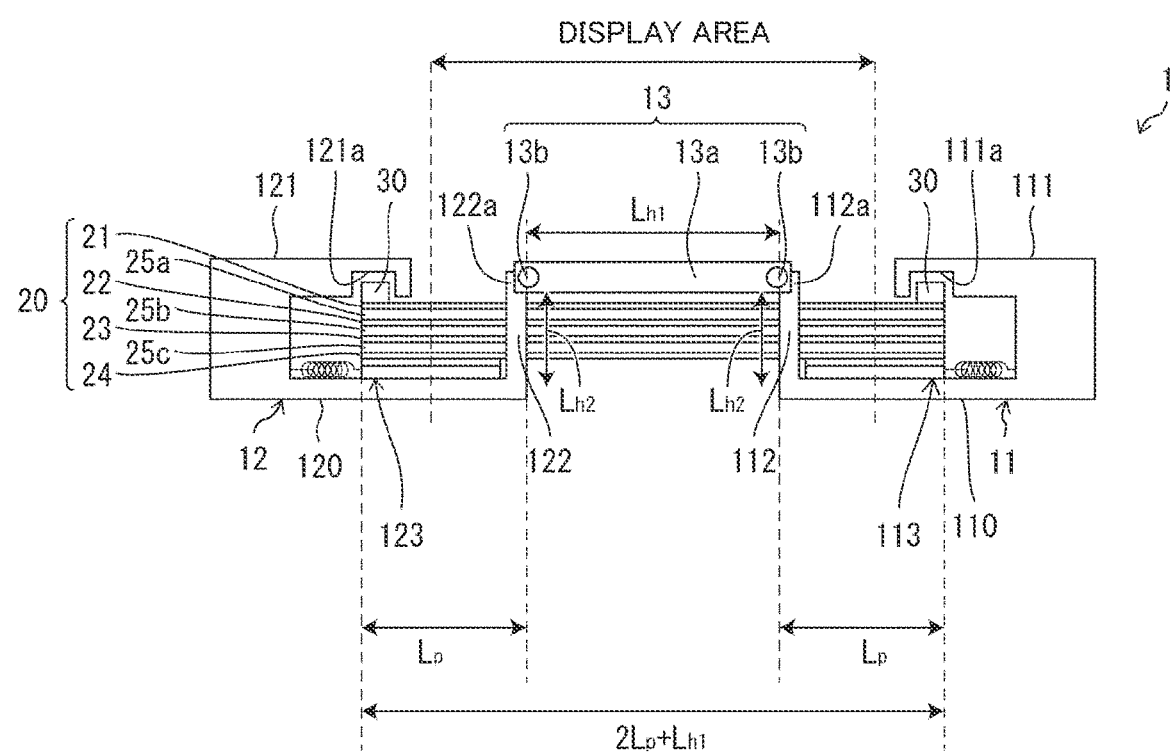
FIG. 6 is a side view of the same display device as that in FIG. 3.

Here, FIG. 6 is a side view of the same display device as that in FIG. 3. FIG. 6 illustrates the length of each portion of the case 10 necessary for description in addition to the display area of the display module 20.

As illustrated in FIG. 6, the first bezel 11 and the second bezel 12 are coupled together in a higher position than the bottoms 110 and 120 by the hinge 13. To be specific, $L_{h2}$ is a length from the surface of the bottom 110, where the display module 20 is set, to the center of the rotation shaft 13b, by which the coupling portion 112 or 122 provided on the bottom 110 or 120 is coupled. Here, $L_P$ is a length from the center of the rotation shaft 13b by which the coupling portion 112 is coupled to one of the ends of the display module 20 fastened to the bottom 110 of the first bezel 11. Likewise, $L_P$ is a length from the center of the rotation shaft 13b by which the coupling portion 122 is coupled to the other end of the display module 20 fastened to the bottom 120 of the second bezel 12. Further, $L_{h1}$ is a length between the rotation shafts 13b provided at one end and the other end of the each hinge body 13a.

The display module 20 is fastened to the slide mechanisms 113 and 123 in such a manner that the length from one end to the other end of the display module 20 placed in the first bezel 11 and second bezel 12 is equal to a length $2L_P+L_{h1}$, as shown in FIG. 6, when the case 10 is open.

The upper part of FIG. 7 is a side view of the display device 1 with the case 10 closed, that is, a side view of the display device 1 folded. The lower part of FIG. 7 is a side view of the display device 1 developed from its folded state. When the display device 1 having the foregoing lengths shown in FIG. 6 at the respective locations is folded, the display module 20 has a slip (positional shift) occurring with a length denoted by S in the upper part of FIG. 7. The slip occurs because the adhesive layer 25, joining the layers together, deforms. Further, the degrees of deformation in the adhesive layers 25a to 25c are different from other when the case 10 remains folded, as clearly seen from FIG. 7. Here, the difference in length between the lowermost layer and uppermost layer in a portion where the display module 20 bends is determined by $(2\times\pi\times r1-2\times\pi\times r2)/2=\pi\times(r1-r2)$ when the shape of the bent portion is formed approximately into a semicircle, where r1 denotes the curvature radius of the uppermost layer, where r2 denotes the curvature radius of the lowermost layer. The difference in curvature radius between the lowermost layer and the uppermost layer, which is denoted as r1−r2, is equal to the thickness, D, of the display module 20 (see FIG. 5), and thus, the slip length S between both ends of the display module 20 can be expressed as $\pi\times D/2$.

The engaging portions 111a and 121a of the cover portions 111 and 121 engage with the engaged portions 30, provided in the window film 21, thus eliminating a slip in the window film 21 resulting from such folding. To be specific, in conjunction with an operation from the folded state of the case 10 to the developed state of the case 10, the engaging portions 111a and 121a engage with the engaged portions 30 and pull the window film 21 in such a manner that the window film 21 is in parallel. In detail, as illustrated in the lower part of FIG. 7, the cover portions 111 and 121 individually pull the window film 21 in directions denoted by the open arrows by $\pi\times D/2$ from region C, where the two hinges 13 are linked, to thus undo the slip.

Here, the hinges 13 are located in a higher position than the bottoms 110 and 120 of the first bezel 11 and second bezel 12 by $L_{h2}$, as earlier described. Hence, the display module 20 with the case 10 open is $2L_P+L_{h1}$ long, but the display module 20 with the case 10 folded is apparently $2L_P+L_{h1}-2L_{h2}$ long, which is shorter than it is in the open state. Accordingly, gaps are generated between the window film 21, the engaging portions 111a and 121a of the cover portions 111 and 121, and the engaged portions 30, thereby being able to avoid the window film 21 from a break resulting from excessive pull.

Further, the slide mechanisms 113 and 123, fastening the display panel 24 on the bottom surface of the display module 20, at this time slides the display panel 24 with respect to the window film 21 in accordance with the open/closed state of the case 10, thus being able to correct the difference in length between the top surface and bottom surface of the display module 20 resulting from a slip.

The slide mechanisms 113 and 123 include the following: a corresponding one of lowermost-layer support plates 113a and 123a composed of a flat plate; and a corresponding one of springs 113b and 123b having their respective ends connected to the lowermost-layer support plates 113a and 123a, and their respective other ends connected to the bezels 11 and 12. The lowermost-layer support plates 113a and 123a are fastened to the display panel 24, constituting the lowermost layer of the display module 20, with an adhesive material or other things. The springs 113b and 123b are compressed when the case 10 is folded, and the spring 113b and 123b are stretched by elasticity when the case 10 is developed. This enables the lowermost-layer support plates 113a and 123a to slide along the bottoms 110 and 120 of the respective bezels. The lowermost-layer support plates 113a and 123a are desirably composed of a flat plate of metal that is easy to process into a thin plate, such as SUS or aluminum. It is noted that guide mechanisms may be provide that guide the sliding of the lowermost-layer support plates 113a and 123a. It is noted that plate springs may be provided as the slide mechanisms 113 and 123 instead of the lowermost-layer support plates 113a and 123a and of the springs 113b and 123b.

It is noted that the engaged portions 30 of the window film 21 do not engage with the engaging portions 111a and 121a of the cover portions 111 and 121 at the time of the folding of the case 10. However, such contact as not to produce a force from the first bezel 11 and second bezel 12 toward the display module 20 is allowable.

FIG. 8 illustrates a display device 1000 according to a comparative configuration, which is not included in one aspect of the present disclosure. FIG. 8 illustrates a hinge 1300 that is not located in a higher position, but is flush with the bottom of a first bezel 1100 and the bottom of a second bezel 1200, unlike the hinge 13 according to this embodiment (see FIG. 6). Further, no cover portions 111 and 121 as well as no engaging portions 111a and 121a according to this embodiment are provided, and unlike this embodiment, no engaged portions 30 are provided in the uppermost layer of the display module 20 (see FIG. 6 and other things).

In the display device 1000 according to the comparative configuration in FIG. 8, where the configuration of this embodiment is not applied, closing a case 1010, followed by folding the display surface causes each layer to slip to mitigate a stress occurring between the frontside and backside of a display module 1020. The case 1010, if opened as is, opens with each layer of the display module 1020 remaining slipped. Hence, if opening and closing are repeated, interlayer expansion called buckling in the direction of display occurs in a folded portion of an uppermost layer 1021 of the display module 1020 and of a group of staked layers thereunder in FIG. 8, thus causing flection in the folded portion of the display surface. Such bending that the display surface protrudes particularly causes the highest degree of slippage in the uppermost layer of the display module and causes a high degree of buckling as well. If buckling occurs, a bend in the form of a protrusion is produced on the display surface of the display module 1020, thus causing delamination, thereby degrading display quality. It is noted that the amount of slippage depends not on a curvature radius in the folded state, but on the thickness D (see FIG. 5) and is expressed as $\pi \times D/2$ as earlier described.

To address such a problem, the display device 1 according to this embodiment is configured such that the engaging portions 111a and 121a, provided in the cover portion 111 and 121, engage with the engaged portions 30 of the display module 20 and pull the display module 20 to a normal length, i.e., $2L_P + L_{h1}$ every time the case 10 opens, and hence, a slip resulting from folding is corrected every time.

Here, the stacked layers under the window film 21 of the display module 20 are pulled by the adhesive layers (not shown) joining the respective layers in synchronization with the window film 21, and hence, their individual slips are corrected.

The display device 1 with the foregoing configuration can avoid flection in its display surface even when the display surface undergoes folding.

First Modification

Although this embodiment has described a configuration where the engaged portion 30 of the display module 20 extends along the end side of one end of the display module 20 and the end side of the other end of the same, the present disclosure is not limited to this configuration. In some aspects for instance, a plurality of engaged portions may be arranged at intervals along the end side of one end of the display module 20 and the end side of the other end of the same.

Second Modification

The display device 1 according to this embodiment is configured such that as illustrated in FIG. 3, the display module 20 is exposed on a side surface of the case 10 where the hinge 13 is provided (the same holds true for the left side surface). However, this aspect is non-limiting; the side surface where the hinge 13 is provided may be provided with a side wall, like the side surfaces of one end and the other end of the case 10.

Third Modification

Although the window film 21 is used in this embodiment, a foldable glass window may be used instead.

Second Embodiment

Another aspect of the present disclosure will be described with reference to FIG. 9 through FIG. 13. It is noted that for convenience in description, components having the same functions as those described in the first embodiment will be denoted by the same signs, and their description will not be repeated.

FIG. 9 is a front view of a display device 1' according to the second embodiment viewed from its display surface. FIG. 10 illustrates the backside of the display device 1' viewed from its non-display surface, which corresponds to the backside of the display surface in FIG. 9. FIG. 11 a side view of the display device 1'. FIG. 12 is a side view of the display device 1' viewed from a direction orthogonal to the direction in FIG. 11.

The display device 1' according to this embodiment includes a case 10' provided with, instead of the recesses used as the engaging portions 111a and 121a according to the first embodiment, engaging portions 111a' and 121a' composed of protrusions protruding toward the side surface of the uppermost layer of the display module. Further, instead of the protrusions used as the engaged portions 30 according to the first embodiment, engaged portions 30' are included that are composed of recesses that engage with the protrusions of the engaging portions 111a' and 121a'.

To be specific, the engaging portions 111a' and 121a' are provided in cover portions 111' and 121' of respective bezels, i.e., a first bezel 11' and a second bezel 12', of the case 10' where a pair of coupling portions 112 and a pair of coupling portions 122, both provided so as to sandwich a display module 20', are provided. The engaging portions 111a' and 121a' are composed of protrusions protruding toward the side surface of a window film 21' of the display module 20'. FIG. 9 and FIG. 10 illustrate an example where protrusions constituting the engaging portions 111a' and 121a' are provided at four sites around the window film 21' of the display module 20'.

In contrast, the window film 21' of the display module 20' is provided with the engaged portions 30' composed of recesses formed by cutting the outer edges of the side surface. The engaged portions 30' are provided in respective regions facing the engaging portions 111a' and 121a' at the forgoing four sites in total.

Here, FIG. 11 illustrates the length of each portion of the case 10' necessary for description in addition to the display area of the display module 20'. It is noted that $L_{h1}$, $L_{h2}$, and $L_P$ shown in FIG. 11 are the same as those described in the first embodiment, and that their description will be thus omitted.

Further, like that according to the first embodiment, the display module 20' housed in the case 10' is fastened to the slide mechanisms 113 and 123. The display module 20' is $2L_P+L_{h1}$ long when the case 10' is open, as illustrated in FIG. 11.

The display device 1' is configured such that the display surface of the display module 20' can be folded, like the display device 1 according to the first embodiment. Further, the window film 21's of the display module 20' at this time has a slip (positional shift) occurring with a length denoted by S in the display device 1 in the upper part of FIG. 7, described in the first embodiment. Accordingly, in this embodiment, the engaging portions 111a' and 121a' of the first bezel 11' and second bezel 12' engage with the engaged portions 30' of the window film 21', thus eliminating the slip. To be specific, in conjunction with an operation from the folded state of the case 10' to the developed state of the case 10', the engaging portions 111a' and 121a' engage with the engaged portions 30' and pull the window film 21' in such a manner that the window film 21' is in parallel. In detail, the cover portions 111' at two sites of the first bezel 11' and the cover portion 121' at two sites of the second bezel 12' individually pull, by $\pi \times D/2$, the window film 21' in such directions as to move the window film 21' away from a location (region where the two hinges 13 are linked) constituting the protrusion of the fold. Accordingly, the slip is eliminated, and the window film 21' gets back to a parallel state.

Further, like that according to the first embodiment, the display module 20' with the case 10' open is $2L_P+L_{h1}-2L_{h2}$ long because the hinge 13 is in a higher position than the bottoms 110 and 120 of the first bezel 11' and second bezel 12' by $L_{h2}$, but the display module 20' with the case 10' folded is apparently $2L_P+L_{h1}-2L_{h2}$ long, which is shorter than it is in the open state. Accordingly, gaps are generated between the window film 21', the engaging portions 111a' and 121a' of the cover portions 111' and 121', and the engaged portions 30', thereby being able to avoid the window film 21' from a break resulting from excessive pull.

As described above, the display device 1' according to this embodiment is configured such that the engaging portions 111a' and 121a' of the first bezel 11' and second bezel 12' are hooked onto the engaged portions 30' of the display module 20' to thus pull the display module 20' to a normal length, i.e., $2L_P+L_{h1}$, every time the case 10' opens, and hence, a slip is corrected every time.

Here, the stacked layers under the window film 21' of the display module 20' are pulled by the adhesive layer 25, joining the individual layers, in synchronization with the window film 21', and hence, their individual slips are corrected.

The display device 1' with the foregoing configuration can avoid flection in its display surface even when the display surface undergoes folding.

Further, the engaging portion 111a' or 121a' is provided at two sites, i.e., one end and the other end of the cover portion 111' or 121' in an orthogonal direction (the direction of an arrow illustrated in FIG. 12) orthogonal to the direction (the open arrow in FIG. 11) where the engaging portion 111a' or 121a' pulls the window film 21', constituting the uppermost layer of the display module. It is noted that although FIG. 12 illustrates the engaging portion 111a' at two sites in the first bezel 11', the engaging portion 121a' is likewise provided at two sites, i.e., one end and the other end of the second bezel 12' in the orthogonal direction. This enables the window film 21' to be pulled more suitably.

Further, the display device 1' according to this embodiment can be further thinned than the display device 1 according to the first embodiment. The details will be described with reference to FIG. 13. It is noted that for simplification, the illustration of the adhesive layer 25 is omitted in FIG. 13.

FIG. 13 illustrates the display device 1' according to this embodiment viewed laterally with only a region provided with an engaging portion being enlarged and illustrates the display device 1 according to the first embodiment viewed laterally with only a region provided with an engaging portion being enlarged. FIG. 13 illustrates the display device 1 according to the first embodiment on the left side of the drawing sheet, and the display device 1' on the right side of the drawing sheet. The display device 1 according to the first embodiment needs cover portions structured so as to cover a surface of the window film 21 adjacent to the display surface. The display device 1' in contrast needs no such structure, thus enabling the thickness, TH', of the first bezel 11' and second bezel 12' to be smaller than the thickness, TH, of the first bezel 11 and second bezel 12.

Modification

Although the engaged portions 30' composed of recesses are provided in only the uppermost layer (window film 21') in the second embodiment, recesses formed by cutting the outer edges of the side surface of the polarizing plate 22 may be provided not only in the uppermost layer, but also in the polarizing plate 22 thereunder as engaged portions 30'. Further, in this case, the adhesive layer 25a, interposed between the window film 21' and the polarizing plate 22, can be also provided with recesses formed by cutting the outer edges of the side surface of the adhesive layer 25a, as engaged portions 30'.

Further, when the polarizing plate 22 as well is provided with engaged portions 30', the size of the recesses constituting the engaged portions 30' may be different between the window film 21' and the polarizing plate 22. Folding the display module 20' in the aforementioned manner causes the window film 21' to have the greatest buckling. In other words, there is a difference in buckling degree between the window film 21' and the polarizing plate 22. Accordingly, in view of this difference, different recesses constituting the engaged portions 30' may be formed to have different sizes.

SUMMARY

A display device 1, 1' according to a first aspect of the present disclosure includes the following: a display module 20, 20' incorporating at least a display panel, including a stack of a plurality of function layers structured mutually slidably, and structured in a foldable manner; and a case 10, 10' having a first bezel 11, 11' and a second bezel 12, 12' respectively attached to one end and another end of the lowermost layer (display panel 24) of the display module 20, 20' with a slide mechanism 113, 123 interposed, the case 10, 10' having a hinge 13 provided between the first bezel 11, 11' and the second bezel 12, 12', the case 10, 10' housing the display module in a foldable manner, wherein the case 10, 10' houses the display module 20, 20' in a foldable manner in response to selection between a closed state where the first bezel 11, 11' and the second bezel 12, 12' are adjacent to each other with the hinge 13 interposed, and an open state where the first bezel 11, 11' and the second bezel 12, 12' are spaced from each other with the hinge 13 interposed, the case 10, 10' is provided with a coupling portion 112 that couples the hinge 13 and the first bezel 11, 11' together in such a manner that the hinge 13 is located above the uppermost layer (window film 21, 21') of the display module 20, 20' when the case 10, 10' is brought into the open state, and the case 10, 10' is provided with a coupling portion 122 that couples the hinge 13 and the second bezel 12, 12' together in such a manner that the hinge 13 is located above the uppermost layer (window film 21, 21') of the display module 20, 20' when the case 10, 10' is brought into the open state, the case 10, 10' has a cover portion 111, 121 provided in each of the first bezel 11, 11' and the second bezel 12, 12', and covering one end and another end of the uppermost layer (window film 21, 21') of the display module 20, 20', the cover portion 111, 121 is provided with an engaging portion 111a, 121a, 111a', 121a' that engages with an engaged portion 30, 30' provided at the one end and the another end of the uppermost layer (window film 21, 21') of the display module 20, 20', and in conjunction with an operation from the closed state of the case 10, 10' into the open state of the case 10, 10', the engaging portion 111a, 121a, 111a', 121a' engages with the engaged portion 30, 30' and pulls the uppermost layer (window film 21, 21') of the display module 20, 20' in such a manner that the uppermost layer (window film 21, 21a') is in parallel.

The foregoing configuration can provide a display device that can avoid flection in its display surface even when its display module undergoes folding. To be specific, even when a slip (positional shift for stress mitigation) occurs between stacked layers of the display module due to folding, engaged portions provided in the uppermost layer of the display module engage with engaging portions provided in the respective bezels in conjunction with case opening with respect the hinge, that is, in conjunction with folding development, thus pulling the uppermost layer. This can avoid the slip, caused at the time of the folding, from turning into interlayer expansion and remaining after the development. The foregoing configuration can thus provide a display device that can avoid flection in its display surface.

The display device 1, 1' according to a second aspect of the present disclosure is preferably configured, in the first aspect, such that the display module 20, 20' further includes an adhesive layer 25 provided between two adjacent function layers, and the two adjacent function layers are structured mutually slidably by a deformation of the adhesive layer 25.

The foregoing configuration enables the display module 20, 20' to be folded and can eliminate not only a slip in the uppermost layer, but also slips in the plurality of stacked layers under the uppermost layer as a result of the engagement made between the engaged portion and engaging portion at the time of the development, thus pulling the uppermost layer of the display module 20, 20'.

The display device 1 according to a third aspect of the present disclosure is preferably configured, in the first or second aspect, such that the hinge 13 includes a pair of hinge bodies 13a provided to sandwich the display module, and a rotation shaft 13b provided at one end and another end of each of the pair of hinge bodies 13a, and coupled to be able to rotate a distal end 112a, 122a of the coupling portion 112, 122.

The foregoing configuration enables opening and closing firmly with the case 10, 10' stable.

The display device 1, 1' according to a fourth aspect of the present disclosure is configured, in the first to third aspects, such that the slide mechanism 113, 123 slides the lowermost layer (display panel 24) of the display module 20, 20' with respect to the uppermost layer (window film 21, 21') of the display module 20, 20' in accordance with an open/closed state of the case 10, 10'.

The forgoing configuration can eliminate flection in the display module 20, 20' also from the lowermost layer (display panel 24) of the display module 20, 20' in conjunction with the opening of the case 10, 10'.

The display device 1, 1' according to a fifth aspect of the present disclosure is preferably configured, in the fourth aspect, such that the slide mechanism 113, 123 includes the following: a lowermost-layer support plate 113a, 123a fastened to the lowermost layer (display panel 24) of the display module 20, 20', and provided in a corresponding one of the first bezel 11, 11' and the second bezel 12, 12' so as to be able to slide; and a spring 113b, 123b having one end connected to the lowermost-layer support plate, and another end connected to a corresponding one of the first bezel 11, 11' and the second bezel 12, 12'.

In the foregoing configuration, the compression and stretch of the spring 113b, 123b causes the lowermost-layer support plate 113a, 123a to slide with respect to the first bezel 11, 11 or the second bezel 12, 12'. Further, a slip of the lowermost layer (display panel 24) of the display module 20, 20' can be eliminated as a result of this slide.

The display device 1 according to a sixth aspect of the present disclosure is preferably configured, in the first to fifth aspects, such that the engaging portion 111a, 121a is composed of a recess provided in the cover portion 111, 121, and the engaged portion 30 is composed of a protrusion that engages with the recess.

In the foregoing configuration, the engaged portion 30, which is a protrusion provided in the uppermost layer (window film 21) of the display module 20, engage with the engaging portion 111a, 121a, which is a recess provided in the cover portion 111, 121, and in conjunction with the opening of the case 10 with respect to the hinge 13, the cover portion 111, 121 pulls the uppermost layer (window film 21) of the display module 20 in such manner that the uppermost layer (window film 21) is in parallel. This achieves a display device without flection in its display surface.

The display device 1' according to a seventh aspect of the present disclosure is preferably configured, in the first to fifth aspects, such that the engaging portion 111a', 121a' is composed of a protrusion protruding toward a side surface of the uppermost layer (window film 21') of the display module 20', and the engaged portion 30' is composed of a recess that engages with the protrusion.

In the foregoing configuration, the engaging portion 111a', 121a', which is a protrusion provided in the cover portion 111' 121', engages with the engaged portion 30', which is a recess provided in the uppermost layer (window film 21') of the display module 20', and in conjunction with the opening of the case 10' with respect to the hinge 13, the cover portion 111, 121 pulls the uppermost layer (window film 21') of the display module 20' in such a manner that the uppermost layer (window film 21') is in parallel. This achieves a display device without flection in its display surface.

The display device 1' according to an eighth aspect of the present disclosure is preferably configured, in the first to seventh aspects, such that the engaging portion is provided at two sites in the cover portion 111', 121', the two sites being one end and another end in an orthogonal direction (FIG. 12) orthogonal to a direction where the engaging portion pulls the uppermost layer (window film 21') of the display module 20'.

In the foregoing configuration, the engaging portion engages with the engaged portion at the two sites in each of the bezels 11' and 12', thereby enabling the display module to be pulled more suitably.

The display device 1, 1' according to a ninth aspect of the present disclosure is preferably configured, in the first to eighth aspects, such that the coupling portion 112, 122 and the cover portion 111, 121, 111', 121' are integrated with each of the first bezel 11, 11' and the second bezel 12, 12'.

In the foregoing configuration, such integration can reduce the number of components.

The display device 1, 1' according to a tenth aspect of the disclosure is configured, in the first to ninth aspects, such that the display module can incorporate a touch panel 23, a polarizing plate 22, and a window film 21, 21' provided sequentially on the display panel 24.

The present disclosure is not limited to the foregoing embodiments. Various modifications can be devised within the scope of the claims. An embodiment that is obtained in combination, as necessary, with the technical means disclosed in the respective embodiments is also included in the technical scope of the present disclosure. Furthermore, combining the technical means disclosed in the respective embodiments can form a new technical feature.

The invention claimed is:

1. A display device comprising:
a display module incorporating at least a display panel, including a stack of a plurality of function layers structured mutually slidably, and structured in a foldable manner; and
a case having a first bezel and a second bezel respectively attached to one end and another end of a lowermost layer of the display module with a slide mechanism interposed, the case having a hinge provided between the first bezel and the second bezel, the case housing the display module in a foldable manner,
wherein the case houses the display module in a foldable manner in response to selection between a closed state where the first bezel and the second bezel are adjacent to each other with the hinge interposed, and an open state where the first bezel and the second bezel are spaced from each other with the hinge interposed,
the case is provided with a coupling portion that couples the hinge and the first bezel together in such a manner that the hinge is located above an uppermost layer of the display module when the case is brought into the open state, and the case is provided with a coupling portion that couples the hinge and the second bezel together in such a manner that the hinge is located above the uppermost layer of the display module when the case is brought into the open state,
the case has a cover portion provided in each of the first bezel and the second bezel, and covering one end and another end of the uppermost layer of the display module,
the cover portion is provided with an engaging portion that engages with an engaged portion provided at the one end and the another end of the uppermost layer of the display module, and
in conjunction with an operation from the closed state of the case into the open state of the case, the engaging portion engages with the engaged portion and pulls the uppermost layer of the display module in such a manner that the uppermost layer is in parallel.

2. The display device according to claim 1, wherein
the display module further includes an adhesive layer provided between two adjacent function layers, and
the two adjacent function layers are structured mutually slidably by a deformation of the adhesive layer.

3. The display device according to claim 1, wherein
the hinge includes
a pair of hinge bodies provided to sandwich the display module, and
a rotation shaft provided at one end and another end of each of the pair of hinge bodies, and coupled to be able to rotate a distal end of the coupling portion.

4. The display device according to claim 1, wherein
the slide mechanism slides the lowermost layer of the display module with respect to the uppermost layer of the display module in accordance with an open/closed state of the case.

5. The display device according to claim 4, wherein
the slide mechanism includes
a lowermost-layer support plate fastened to the lowermost layer of the display module, and provided in a corresponding one of the first bezel and the second bezel so as to be able to slide, and
a spring having one end connected to the lowermost-layer support plate, and another end connected to a corresponding one of the first bezel and the second bezel.

6. The display device according to claim 1, wherein
the engaging portion is composed of a recess provided in the cover portion, and
the engaged portion is composed of a protrusion that engages with the recess.

7. The display device according to claim 1, wherein
the engaging portion is composed of a protrusion protruding toward a side surface of the uppermost layer of the display module, and
the engaged portion is composed of a recess that engages with the protrusion.

8. The display device according to claim 1, wherein the engaging portion is provided at two sites in the cover portion, the two sites being one end and another end in an orthogonal direction orthogonal to a direction where the engaging portion pulls the uppermost layer of the display module.

9. The display device according to claim 1, wherein the coupling portion and the cover portion are integrated with each of the first bezel and the second bezel.

10. The display device according to claim 1, wherein the display module incorporates a touch panel, a polarizing plate, and a window film provided sequentially on the display panel.

* * * * *